UNITED STATES PATENT OFFICE.

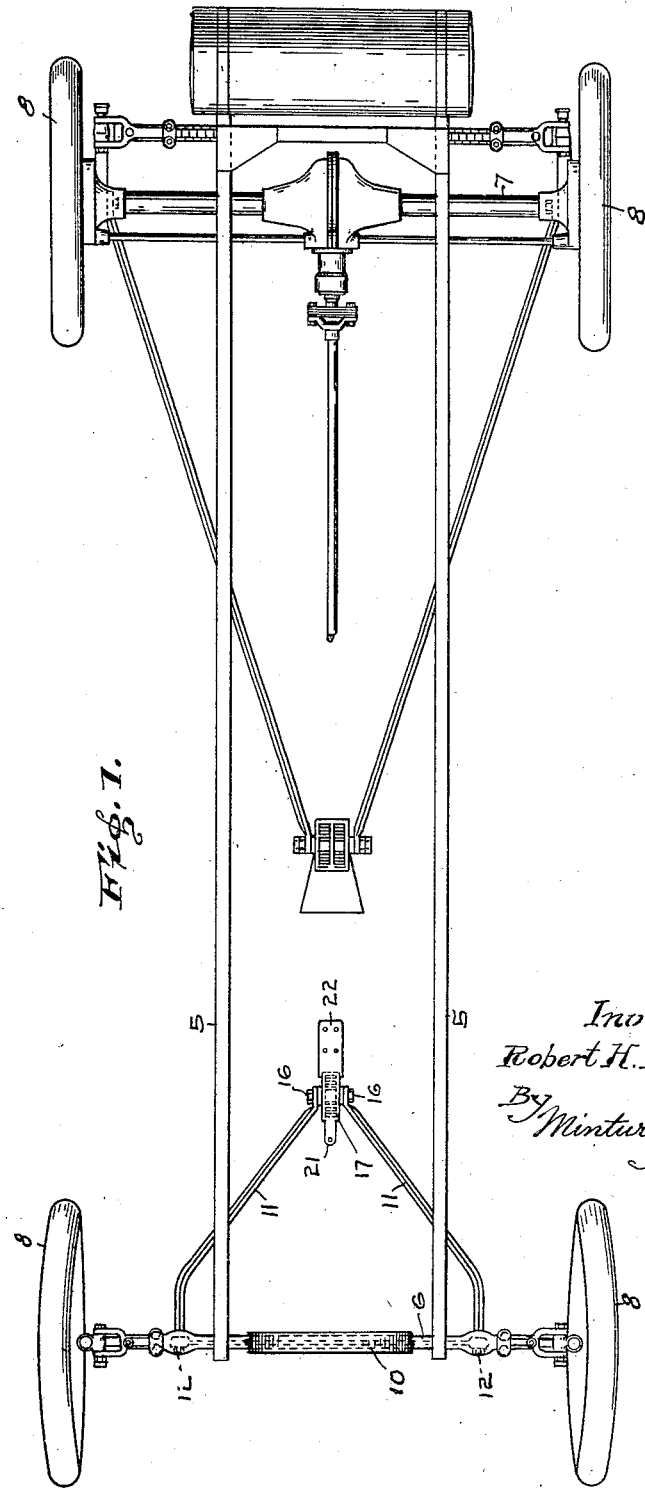

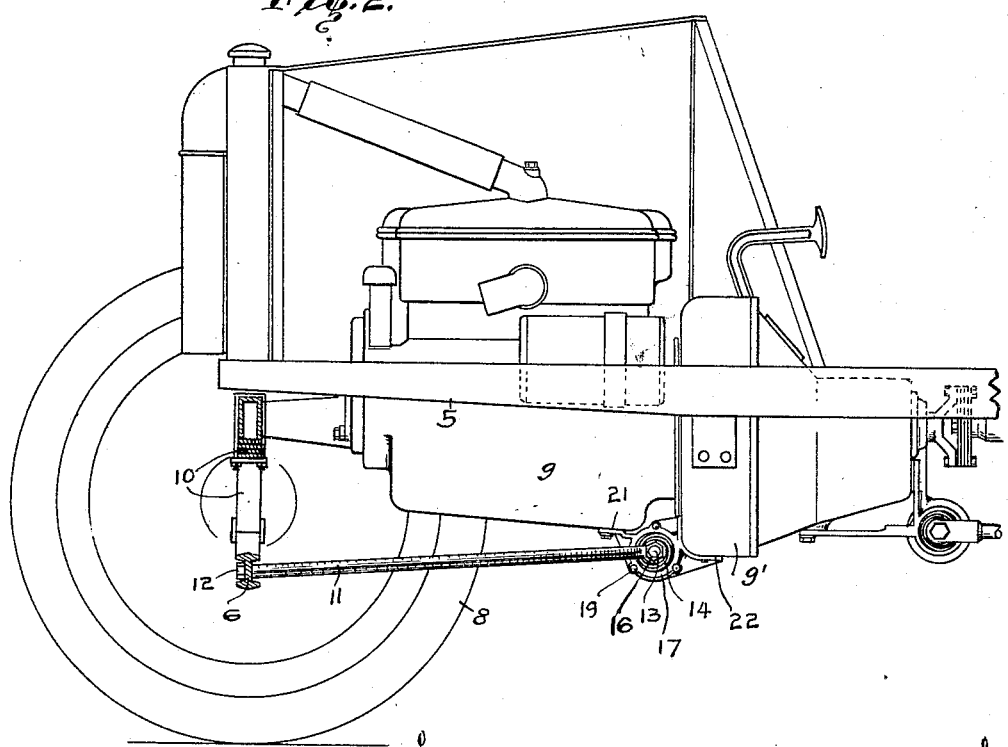
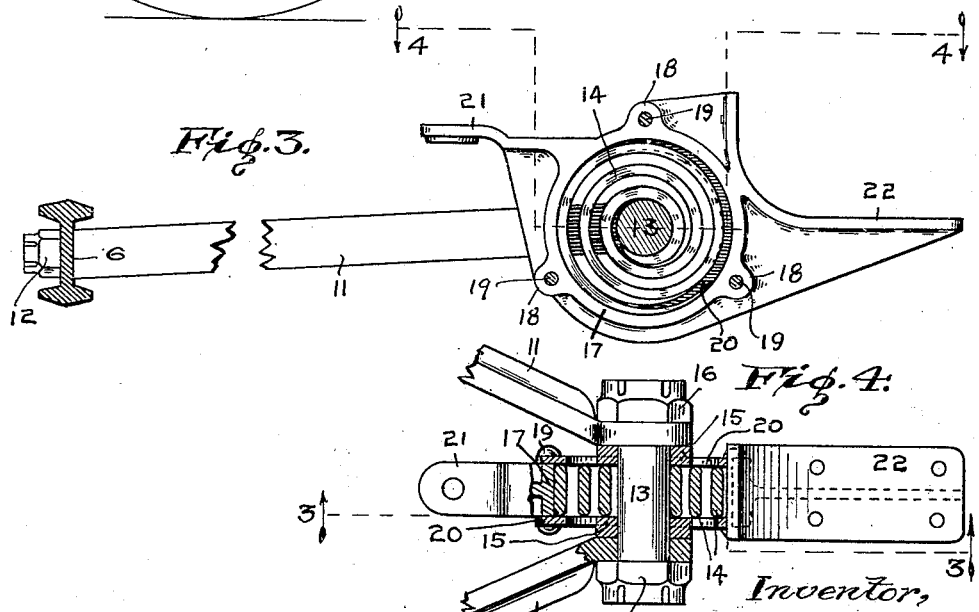

ROBERT H. HASSLER, OF INDIANAPOLIS, INDIANA.

MOTOR-VEHICLE.

1,199,547.  Specification of Letters Patent.  Patented Sept. 26, 1916.

Application filed April 7, 1916. Serial No. 89,657.

*To all whom it may concern:*

Be it known that I, ROBERT H. HASSLER, a citizen of the United States, residing at Indianapolis, in the county of Marion and State of Indiana, have invented certain new and useful Improvements in Motor-Vehicles, of which the following is a specification.

The object of this invention is to provide a radius rod and connections between the axles and frames of vehicles, through which the stresses and shocks from the axles will be yieldingly resisted. The device of this invention is a modification of those shown in my Patents No. 1,165,405 and No. 1,164,618.

This invention may be applied to the steering or to the driving axles of vehicles, and comprises a triangular truss formed by the axle and two radius rods. One end of each radius rod is rigidly secured to the axle at points widely separated. The other two ends of the radius rods converge toward each other, and are joined together by a short stud. This stud is rigidly secured to one coil of the volute spring,—other coils of the same spring being held to the frame members of the car.

In Patent No. 1,165,405, above referred to, the radius rods and volute springs are arranged in such a way that the stresses are delivered almost entirely in a direction radial of the springs, and in Patent No. 1,164,618, the radius rods and volute springs are arranged in such a way that the stresses are nearly all in a direction at right angles to the plane of the springs.

The object of the present invention is to more efficiently use the volute spring than is possible in either of the other two forms, and to subject the spring to strains in both axial and radial directions.

I accomplish the objects of the invention by the mechanism illustrated in the accompanying drawing, in which—

Figure 1 is a top plan view of a motor-vehicle running gear embodying my invention. Fig. 2 is a longitudinal vertical section of the front end of same on an enlarged scale. Fig. 3, is a cross section of the front axle and the stud connecting the converging ends of the two radius rods, on the line 3—3 of Fig. 4, and Fig. 4 is a section on the line 4—4 of Fig. 3.

Like characters of reference indicate like parts throughout the several views of the drawings.

The invention may be applied to either front or rear axle or to both, and I have shown it as applied to a front axle of a motor vehicle in which 5 is the frame proper, 6 the front axle, 7 the rear axle, 8 the road-wheels, 9 and 9' the motor and fly-wheel housings respectively, which are rigidly attached to the frame, and when the frame is hereafter referred to will be understood as comprised therein, and 10 the front leaf spring between the axle and the frame.

11 represents the two diagonal radius rods, which have one of their ends screw-threaded and extended through the front axle and there secured by a nut 12 These two rods form a V shaped brace, the two converging ends of which are connected by a stud 13, which passes through the inner coil of a volute spring 14 with which it makes a reasonably close fit. Washers 15 are between the spring and the adjacent ends of the brace-rods 11, whereby both rods are bolted to the central coil of the spring by tightening up nuts 16 on the threaded ends of the stud.

The spring 14 is supported by an annular casing 17, having perforated outside lugs 18, for the passage of rivets (or bolts) 19, which secure annular plates 20, to each side of the casing 17, after the assembly of the spring in the latter. Flanges 21 and 22, integral with the casing 17, provide means for bolting the casing 17 rigidly to the motor and fly-wheel housing portions of the main frame.

When one of the wheels of the car strikes a road obstruction, the triangular truss has three different actions on the volute spring. First, it acts in a radial direction pressing the convolutions toward one another with gradual accumulative effect. Second, it acts in an axial direction tending to telescope the convolutions of the spring through one another. Third, it subjects the spring to a torsional strain by which its inner coil is thrown on an angle with its outer coil, this action being emphasized when one of the wheels of the car is lifted with reference to the other three wheels.

With the above actions, more movement is afforded the axle ends than would be possible by any form of universal joint at the converging ends of the radius rods,—and the road wheels are cushioned against shocks in a manner not possible with other known radius rod constructions. At the same time, these results are secured without the use of any bearing parts, frictional or sliding parts, to wear loose and rattle, such as must be used on any form of universal joint.

Having thus fully described my invention, what I claim as new and wish to secure by Letters Patent of the United States, is—

1. The combination, with a vehicle frame and an axle, of a pair of radius rods rigidly secured to the axle, a volute spring, and means for securing the ends of the radius rods remote from the axle to a coil of the spring.

2. The combination with a vehicle frame and an axle by which the frame is supported, of a volute spring and two radius rods rigidly secured at one end to the axle and extending to form a V-shaped brace, the converging ends of the radius rods being attached to one coil of the volute spring and another coil of the volute spring being fastened to a rigid support from the frame members of the vehicle.

3. The combination of a vehicle frame, an axle by which the frame is supported, a volute spring, a spring support attached to the frame, to which support the outer coil of the spring is fastened, a pair of radius rods rigidly secured at one end to the axle and extending to form a V-shaped brace, a stud passing through the inner coil of the spring to which the ends of the radius rods remote from the axle are fastened.

4. The combination of a vehicle frame, an axle by which the frame is supported, a cylindrical spring-housing having annular heads, a volute spring assembled in said housing to which housing the outer coil of the spring is fastened, a pair of radius rods rigidly secured at one end to the axle and extending to form a V-shaped brace, and a stud passing through the inner coil of the spring to which the ends of the radius rods remote from the axle are fastened.

In witness whereof, I have hereunto set my hand and seal at Indianapolis, Indiana, this 1st day of April, A. D. one thousand nine hundred and sixteen.

ROBERT H. HASSLER. [L. S.]